FIG. 1.

INVENTOR
Raymond R. Hamel

March 28, 1967 R. R. HAMEL 3,311,206
VENDING MACHINE AND CHECK CONTROL APPARATUS THEREFOR
Filed April 28, 1965 7 Sheets-Sheet 2

March 28, 1967  R. R. HAMEL  3,311,206
VENDING MACHINE AND CHECK CONTROL APPARATUS THEREFOR
Filed April 28, 1965  7 Sheets-Sheet 4

March 28, 1967 R. R. HAMEL 3,311,206
VENDING MACHINE AND CHECK CONTROL APPARATUS THEREFOR
Filed April 28, 1965 7 Sheets-Sheet 7

United States Patent Office 3,311,206
Patented Mar. 28, 1967

3,311,206
VENDING MACHINE AND CHECK CONTROL
APPARATUS THEREFOR
Raymond R. Hamel, West Springfield, Mass., assignor to Westinghouse Electric Corporation, Pittsburgh, Pa., a corporation of Pennsylvania
Filed Apr. 28, 1965, Ser. No. 451,580
6 Claims. (Cl. 194—2)

The present invention relates to check controlled vending machines and more particularly to a multiple column, post select, vending machine having individual vending release mechanism for each column.

It is a principal object of the present invention to provide a multiple column, multiple release, check controlled, post select vending machine with a simple and reliable interlock control mechanism to prevent the operation of more than one vending release mechanism after a check has been deposited and to return additional checks as may be deposited while a vending release mechanism is being operated.

Another important object of the present invention is to provide a multiple column, multiple release, check controlled, post select vending machine with a simple and reliable interlock control mechanism to prevent the simultaneous operation of more than one vending release mechanism and to prevent the operation of any vending release mechanism for a column that is empty of articles to be vended.

Yet another object of the present invention is to provide a multiple column, multiple release, check controlled, post select vending machine with a simple and reliable interlock control means that is effective to signal the empty condition of any column and to return checks deposited after all columns have been indicated empty or to return checks deposited while any release mechanism is being operated to vend from a particular article storage column that may not be empty at that time.

A still further object of the present invention is to provide an extremely simple and reliable empty signal to be yieldingly operated in a foolproof manner by the interlock control and empty sensing mechanism of the invention as arranged to be used with a multiple column, multiple release, post select, check controlled vending machine.

In accordance with the invention, a multiple column, check controlled vending machine is provided with a plurality of respective vending release mechanism for each respective column of stored articles to be vended. Check controlled interlock means is provided to prevent the operation of any of the release mechanisms until after the check is deposited and to prevent the simultaneous operation of more than one release mechanism after the required check is deposited. In addition, the interlock control means of the invention is interconnected with the check receiving and return mechanism in a manner to return checks that are sought to be deposited while a release mechanism is being operated. A feature of the invention is an arrangement whereby the interlock control means operation is modified to prevent the operation of a respective release mechanism when the associated column is empty of articles to be vended and also whereby the aforesaid interconnection between the interlock control means and the check receiving and return mechanism is effective to return checks sought to be deposited after all of the columns of the machine are empty and all of the vending release mechanisms are locked.

Another feature of the invention is the provision of an extremely simple arrangement of individual empty signals or indicators for each column to be operated by the interlock control and empty sensing mechanism of the invention when a respective column of the machine is empty. According to the invention, each empty signal is comprised of a plunger adapted to extend through an aperture in a wall of the vending machine cabinet and is provided with a spring lever normally urging the plunger to a position substantially within the aperture of the wall and to be yieldingly moved out of the aperture to an operated and projecting empty indicating position when the associated empty sensing and interlock mechanism of the respective column is operative to indicate the absence of articles to be vended in the column.

In a preferred embodiment of the invention, the interlock control mechanism is more specifically comprised of a plurality of aligned slide elements that are slidable in two opposing directions along a path bridging the plurality of side by side positioned vending columns and associated release mechanisms. An interlock slide operating lever for each release mechanism is provided to be moved when each release mechanism is operated and the arrangement is such that if a particular operating lever is prevented from moving, then the associated release mechanism is prevented from operating and therefore locked. Each interlock slide operating lever is provided with an interlock slide engaging wedge surface that when moved upon movement of the vending release mechanism will move one or more of the interlock slides in one of the opposite directions and the remainder of the interlock slides in the opposite direction. The arrangement is such that when the slides are moved in either direction from their normal positions, by a respective interlock slide operating lever, then the remainder of the interlock slide operating levers are prevented from moving their wedge surfaces between adjacent interlock slides to thereby prevent their movement and lock their associated vending release mechanisms. Check controlled latch means is provided to prevent the movement of the interlock slides in one direction and check return means responsive to the movement of the interlock slides in the other direction is connected to the check receiving and return or coin-changer mechanism to return those checks sought to be deposited while a vending release mechanism is being operated.

Further objects, features and the attendant advantages of the invention will be apparent with reference to the following specification and drawings in which.

Figure 1:
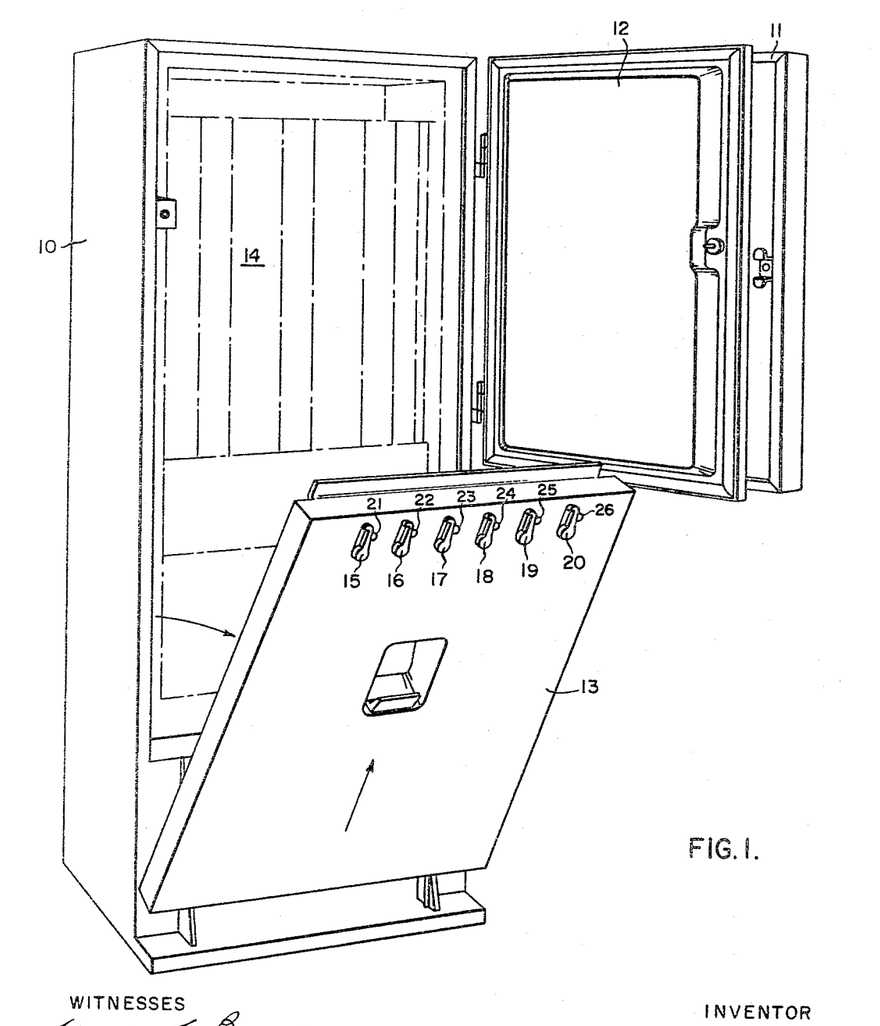
FIGURE 1 is a perspective front elevational view of a vending machine cabinet embodying the interlock and signalling arrangements of the invention.

Referring now to FIG. 1 of the drawings, a vending machine cabinet structure 10 is shown to be provided with the upper side hinged front door structures 11 and 12 and a lower horizontal bottom hinged door structure 13. The vending machine magazine structure generally shown at 14 is adapted to be contained within the upper part of the vending machine cabinet 10. The invention will be described in connection with a multiple column multiple release arrangement having six article storage column structures to be individually controlled by the manually operable handles 15–20 extending through the lower door 13. Of course the invention is not limited to a particular number of storage columns and individual vending release mechanisms therefor. Also extending through the wall of the lower compartment door 13, in positions adjacent to the vending release mechanism operating handles 15–20, are a plurality of respective empty signal indicator plungers 21–25 which will later be described in more detail. It will be pointed out at this time however, that normally, when articles to be vended are present in a respective storage column, the respective associated empty signal or indicator plunger 21–25 will be retained within the aperture of the lower door 13 in a position not to impede the manual rotary reciprocation of a respective one of the vending release operating handles 15–20. If on the other hand a particular article storage column structure is empty of articles to be vended, the associated empty signal indicator plunger of the group of plungers 21–25 will be projected out of the respective aperture in the door panel 13 in a position to prevent movement of the associated vending release mechanism operating handle in the group of handles 15–20. Suitable indicia may be placed on each of the plungers 21–25 to become visible when each plunger is moved outward of the door panel 13 in the empty signalling position.

Figure 2:
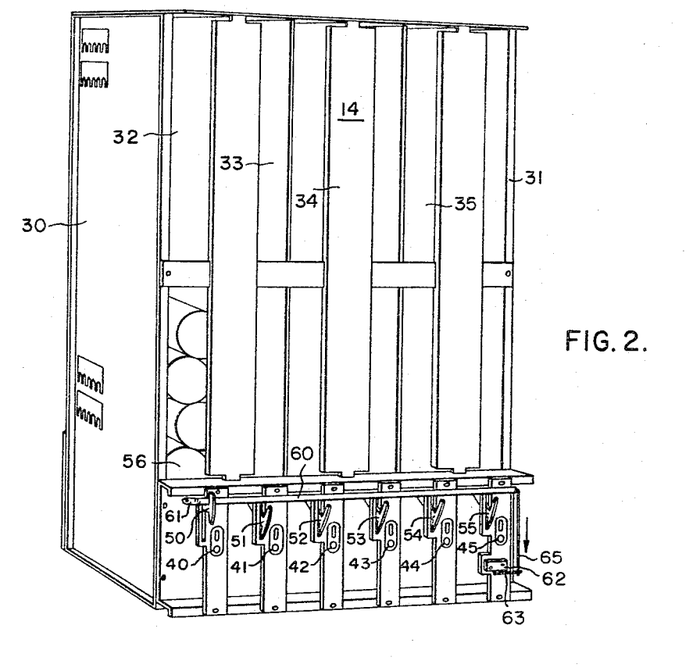
FIG. 2 is a perspective front elevational view of a vending magazine structure embodying the invention.
Figure 3:
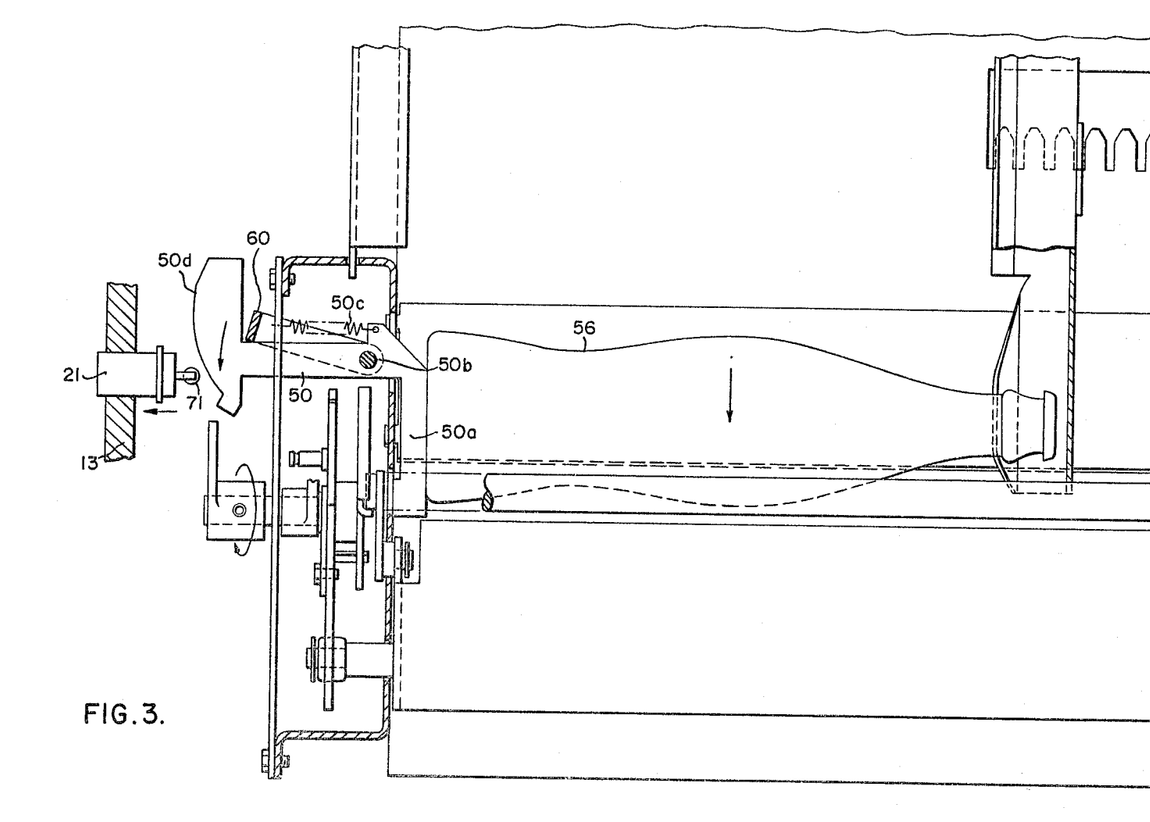
FIG. 3 is a fragmentary sectional view through the lower end of the left-hand column of stored articles as shown by FIG. 2 of the drawings to show details of the empty sensing mechanism.
Figure 4:
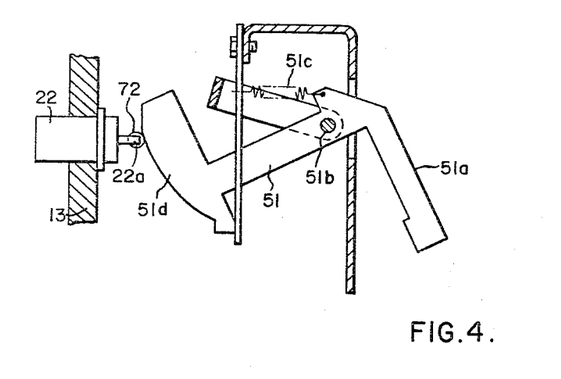
FIG. 4 is a fragmentary sectional detailed view of the empty sensing mechanism of the invention in the position assumed when no article is present in the storage column structure.
Figure 5:
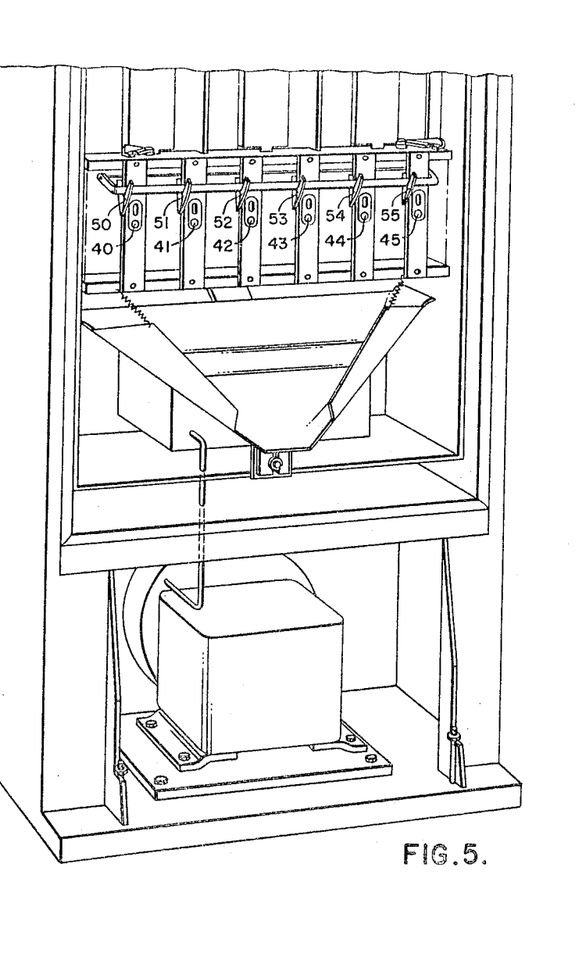
FIG. 5 is a perspective elevational view of the lower part of the vending machine cabinet embodying the invention.
Figure 6:
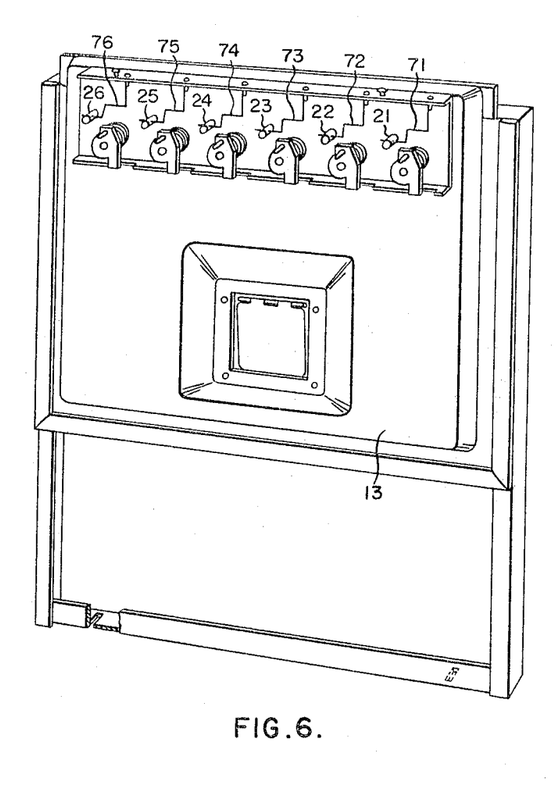
FIG. 6 is a perspective elevational view of the rear of the cabinet door for covering the lower part of the vending machine cabinet and showing the detachable connections for the empty signal indicators and the operating release mechanisms.

Referring now to FIGS. 2–4 of the drawings, some further detail of the vending machine magazine structure will be given. The magazine structure 14 includes the spaced vertically positioned end wall panels 30 and 31 together with parallel spaced interior partitions or panels 32–35 that divide the magazine structure into a plurality of six article storage column structures respectively. Vending release mechanisms are provided at the lower end of each of the vertical side by side positioned storage column structures and operating shafts 40–45 are provided to be rotatably reciprocated first in the clockwise direction and then in the counterclockwise direction to operate the vending release mechanisms. A complete detailed description of the vending release mechanisms will not be made herein since the details of their arrangements are not necessary for an understanding of the present invention. If a more detailed understanding of the vending release mechanisms is required, reference may be made to the copending patent application of Francis A. Gasparini, filed Apr. 28, 1965, Ser. No. 451,579, and assigned to the same assignee of the present application for patent.

Also mounted at the lower end of each column structure of the vending machine magazine 14 is a respective empty sensing lever 50–55. The empty sensing lever 50 is shown in the raised position assumed when articles to be vended are present such as the bottle 56, while the remainder of the empty sensing levers 51–55 are shown in the lower position assumed when no articles to be vended are present in the associated column structures. As is more clearly shown by FIG. 3 of the drawings, each of the empty sensing levers such as the lever 50 is provided with a bell crank portion 50a which is engaged by the heel or butt end of the bottle 56 to maintain the empty sensing lever in the upper or first position to indicate the presence of an article to be vended. It will be noted that each of the empty sensing levers such as the lever 50 is pivoted about a pivot point such as the pivot point 50b and a tension spring 50c is provided to constrain the empty sensing lever 50 to move in the direction of the arrow downward when an article to be vended is not present in the column storage structure to bear against the ball crank end 50a of the empty sensing lever. As more clearly shown by FIG. 4 of the drawings, when an article to be vended is not present in the storage column structure, the empty sensing lever such as the lever 51 will pivot around the pivot point 51b to cause its cam end 51d to engage the operating end 22a of the empty signal plunger 22 and project it out of the associated aperture in the lower door wall 13 to an empty indicating position. The position of the empty signal indicator plunger 22, as shown by FIG. 4 of the drawings, is to be compared with its position shown by FIG. 3 of the drawings which is the position normally assumed when articles to be vended such as the bottle 56 are present in the associated column storage structure of the machine.

An all empty signal lever 60 is pivotally mounted at each of its ends such as shown at 61 to the vending machine magazine structure in a position to be normally held in the upper or raised position such as shown by FIG. 2 of the drawings when at least one of the empty sensing levers such as the lever 50 is in the upper position to indicate the presence of articles to be vended in the associated article storage column structure. When the entire machine is empty and all of the empty sensing levers 50–55 are in their lower positions, the all empty sensing bar 60 will move downward in the direction of the arrow shown by FIG. 2 of the drawings to operate the switch 62 to be later referred to in more detail in connection with another feature of the invention.

Referring now more particularly to FIGS. 2–6 of the drawings, it will be seen that each of the empty signal indicator plungers 21–26 is provided with a respective spring lever 71–76 secured to the rear of the cabinet door structure 13 in a manner to normally constrain the respective empty signal plunger to assume the position shown by FIG. 3 of the drawings with the plunger body substantially fully retained within the associated aperture of the door panel 13. When the door panel 13 is in place to enclose the lower portion of the vending machine cabinet, the cam end of each of the empty sensing levers 50–55 such as the cam end 51d or the cam end 50d for empty sensing levers 51 and 50 respectively will be positioned opposite a midpoint of each of the respective wire levers 71–76 for the empty signal plungers 21–26. So long as the respective empty sensing lever is in the upper position such as the position shown for the empty sensing lever 50 by FIG. 3 of the drawings, the respective cam surface such as the cam surface 50d will not be contacting the spring lever for the associated empty signal plunger such as the spring lever 71 for the plunger 21. However, if there are no articles to be vended in the associated vending storage column, then the empty sensing lever will assume a position such as that shown for empty sensing lever 51 by FIG. 4 of the drawings, in which case the cam surface such as the cam surface 51d will contact the spring lever 72 and move the associated empty signal plunger 22 to a projecting position from the exterior surface of the cabinet door 13. It will be noted that the cam surface of the associated empty sensing lever such as the cam surface 51d for lever 51 engages the associated spring lever such as the lever 72 at a point midway between its ends so as to yieldingly urge the empty sensing plunger connected thereto such as the plunger 22 to the outer empty indicating position. Thus if a customer misunderstands the functioning of the machine and attempts to press the empty indicating plunger such as the plunger 22 back into the machine cabinet in order to operate the associated vending release handle 16, there will be no damage done to the empty signalling indicator mechanism because the associated spring lever 72 will yield under such improper operation. However, the attempt of the customer to thwart the empty signal indication mechanism of the invention by pushing in the projecting signal plunger 22 will not move the position of the empty sensing lever 51 from the position shown in FIG. 4 and so long as the empty sensing lever such as the lever 51 remains in the position shown by FIG. 4 of the drawings, the associated vending release mechanism cannot be operated. The operation of the vending release mechanism of the invention is prevented as mentioned above whenever the associated empty sensing lever is in the lower position of FIG. 4 of the drawings because of interengagement of the empty sensing lever 50 with the notched surface 80 on the vend plate operating cam 81 that is fixed for rotation with the operating shaft 41 as shown by FIG. 7 of the drawings.

Figure 7:
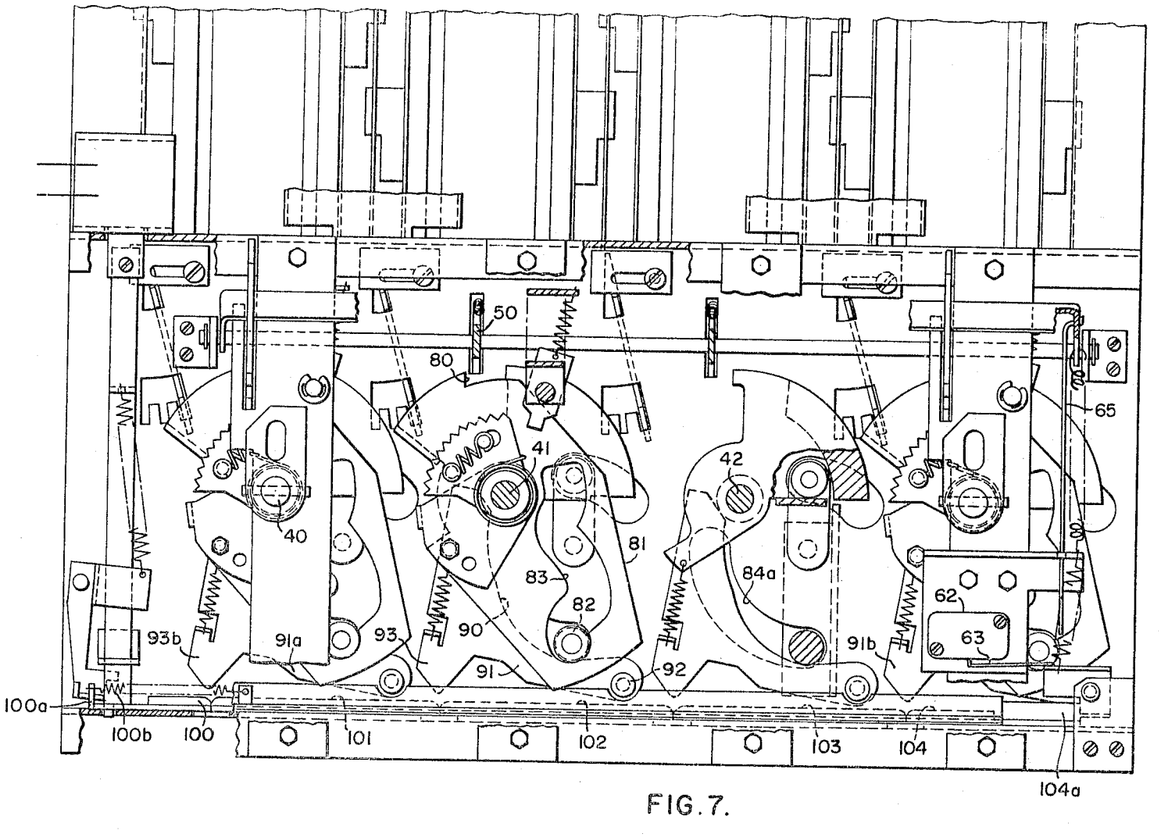
FIG. 7 is a detailed front view of the lower part of the vending machine magazine structure with parts broken away and some parts partly in section to show details of the vending machine operating release mechanisms and interlocking means for each storage column.

Now referring further to FIG. 7 of the drawings, it will be seen that each vending release mechanism such as the mechanism operated by the shaft 41 includes the vend plate operating cam 81 that must be operated first in the clockwise direction and then in the counterclockwise direction in order to release and vend an article. A roller portion for each of the respective vending release mechanisms such as the roller 82 is received within a cam slot 83 of the respective vend plate cam 81. The roller 82 is also movable within the stationary arcuate slot such as the slot 84 of the magazine structure. Slot 84a is similar and is more clearly seen. As the vending release mechanism is operated upon first a clockwise rotation of the shaft 41 and then a counterclockwise rotation of the shaft 41, the cam roller 82 rides within the arcuate slot 84 and bears against the cam surface 90 of the pivoted interlock slide operating lever 91 which is pivoted at 92 on the magazine structure. A pointed wedge end 93 for the interlock slide operating lever 91 is adapted to penetrate between the interlock slides 101 and 102 to move said slides in respective opposite directions as the interlock operating lever 91 is pivoted in the counterclockwise direction. Unless the interlock lever 91 is permitted to move in the counterclockwise direction, the cam surface 90 will wedge against the cam roller 82 to prevent more than a slight clockwise rotation of the vending shaft 41 thus locking the vending release mechanism. If the interlock slides 101 and 102 are in the position shown by FIG. 7 of the drawings, and assuming the machine to be unlocked by deposit of a check as to be later more fully described, the wedge surface 93 may be permitted to enter between the adjacent end surfaces of the interlock slides 101 and 102 to move them in the respective opposite directions. If, however, the interlock slides have already been moved to an operated position by the operation of another vending release mechanism or if the interlock slide 101 is prevented from moving in the direction to the left of FIG. 7 of the drawings by the coin controlled latching mechanism being in the locked position in a manner to be later described in further detail, then the interlock slide operating lever 91 will be prevented from moving further in the counterclockwise direction and the vending rotation of the shaft 41 will be prevented and locked.

Referring now to FIG. 7 and also FIGS. 8 through 11 of the drawings for a more detailed understanding of the interlock slide and coin controlled features of the invention, it will be seen that the interlock slides such as the interlock slides 101–104 are maintained in alignment and are slidably movable along a path bridging the side by side positioned vending release mechanisms. The interlock slide 100 at the extreme left-hand end of the vending machine is specially formed to have the upturned tongue end 100a to which is secured a tension spring 100b which normally constrains the slide 100 to move to the right of the drawing into engagement with the next slide 101 which is thereby constrained again to the right of the drawing into engagement with the subsequent slides positioned to the right thereof in the aligned slide assembly. The extreme right-hand end slide 104 is also specially formed with an upstanding lever end 104a normally engaging the bell crank lever 105 which is held in the position shown by FIG. 9 of the drawings by the tension spring 106. Thus the opposing forces of the tension springs 100b and 106 serve to maintain the plurality of aligned interlock slides 100–104 in the positions shown by FIG. 9 of the drawings.

Figures 8, 10:
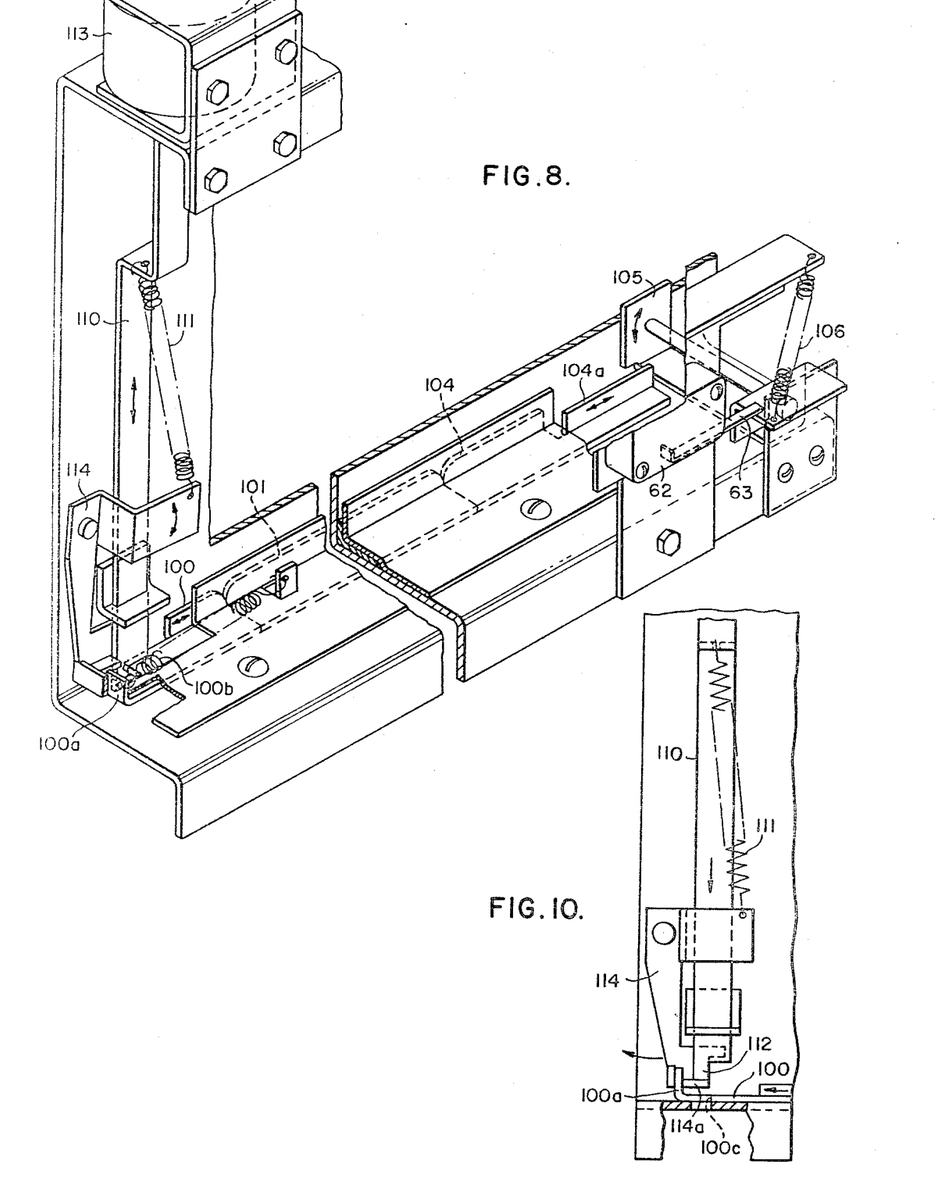
FIG. 8 is a fragmentary perspective elevational view partly broken away and partly in section to show the details of the vending machine check controlled unlocking mechanism and interlock slides.
FIG. 10 is a fragmentary detailed view of the check controlled unlocking trigger mechanism with the parts shown in the unlocked position after coins have been deposited and before the vending release mechanism is operated.
Figure 9:
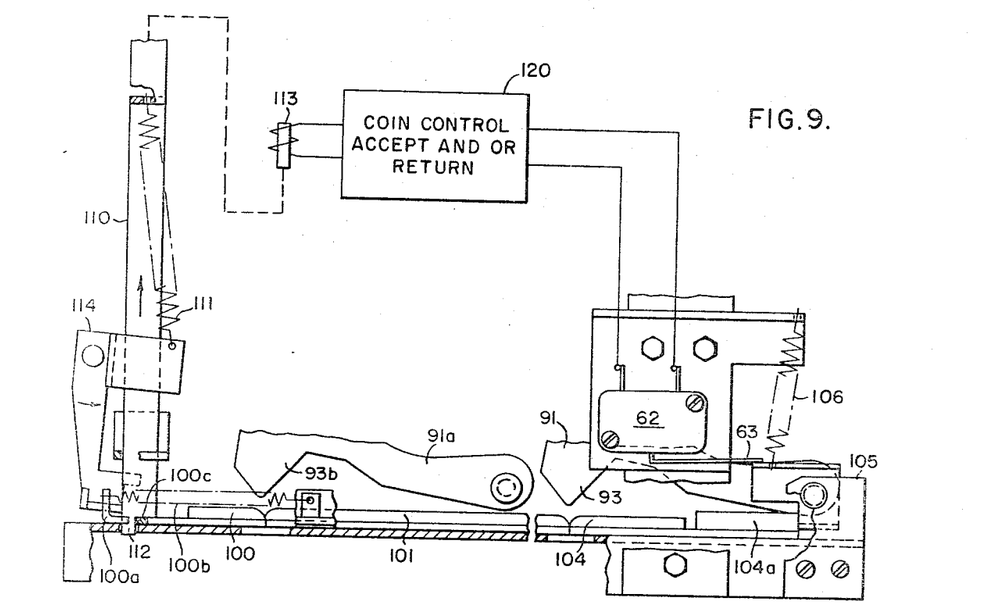
FIG. 9 is an elevational view partly broken away and partly in section to show the details of the check controlled unlocking trigger mechanism and portions of the interlock slide mechanism with the parts shown in the locked position.

A coin control latch lever 110 is normally maintained in the position shown by FIG. 9 of the drawings by the force of the tension spring 111 and when the latch lever 110 is in the position shown with its latching end 112 in engagement with an end surface 100c of the left-hand interlock slide 100 the movement of the interlock slide 100 to the left is prevented. Therefore, with the latch lever 110 in the locked position, the wedge surface 93b of the interlock slide operating lever 91a is prevented from penetrating between the adjoining ends of the interlock slides 100 and 101 thus preventing the counterclockwise movement of the interlock operating slide lever 91a and the requisite clockwise movement of the associated vend shaft for vending purposes so that the vending machine remains locked. Of course any other interlock slide operating lever such as the operating lever 91 will also be prevented from moving in the counterclockwise direction because none of the aligned interlock slides such as the slides 100, 101 and 104 are permitted to move in the direction to the left of the drawings so long as the coin control latch lever 110 remains in the locked position shown by FIG. 9 of the drawings. Upon deposit of the requisite coin or check in the coin control accept and/or return mechanism generally shown at 120, the solenoid 113 will be momentarily energized to raise the latch lever 110 to the position shown by FIG. 10 of the drawings. Details of the coin control accept and/or return mechanism 120 are not shown since they are not part of the present invention and any suitable coin changing control mechanism may be employed therefor. An example of a suitable coin changing accept and return coin control mechanism is manufactured by the National Rejectors Company, Inc. of St. Louis which they refer to as their 3400 series.

Figure 11:
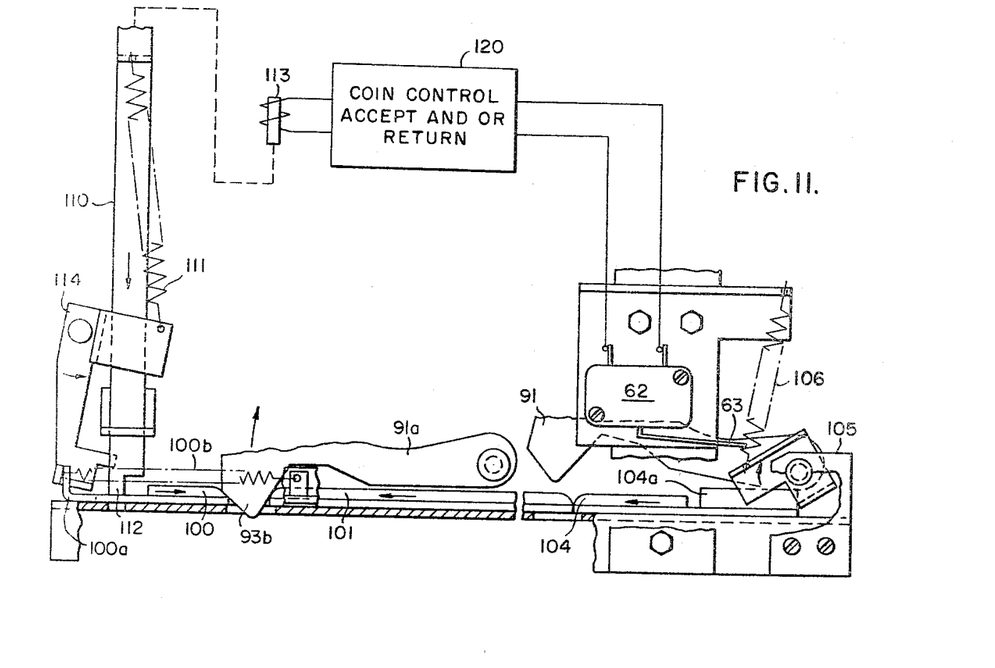
FIG. 11 is a view similar to FIG. 9 but showing the interlock slides in the position assumed while a single vending release operating mechanism is being operated to vend an article from a single storage column of the magazine.

Referring now more particularly to FIG. 10 of the drawings, it will be seen that when the latch lever 110 is raised by the momentary energization of the solenoid 113 upon deposit of the required coinage in the coin control mechanism 120, the latching end 112 will be supported on the surface 114a of the pivotal catch 114 and will be withdrawn from behind the end surface 100c of the interlock slide 100. Thus the interlock slide 100 or any of the other aligned interlock slides such as the slides 101, 102 and 103 may move to the left of the drawing to permit any one of the interlock slide operating levers such as the lever 91a to move in the counterclockwise direction thus unlocking the particular vending release mechanism associated therewith. FIG. 11 of the drawings shows the interlock slide operating lever 91a for the vending release mechanism as operated by the vending shaft 40 in its fully operated counterclockwise position so as to permit the vending rotation of the vend shaft 40. It will be noted that the interlock slide 100 has moved to the left of the drawing while the interlock slide 101 and the remainder of the interlock slides to the right thereof including the interlock slide 104 have moved in the opposite direction to the right of the drawing. The movement of the interlock slide in the direction to the left of the drawing such as the movement shown for the slide 100 is effective to cause the projecting end 100a of the interlock slide 100 to engage and pivotally move in the clockwise direction the catch member 114 thereby allowing the latch lever 110 to drop downward onto the upper surface of the interlock slide 100. Thereafter when the interlock slide 100 moves back in the direction to the right of the drawing in response to the force of the spring 100b upon withdrawal of wedge point of the interlock slide operating lever 91a, when it is moved in the clockwise direction upon the completion of the vending release movement of the vending shaft 40 in the counterclockwise direction, the locking end 112 of the latch lever 110 will drop back behind the end surface 100c of the interlock slide 100 to again lock the machine. It should be obvious that, when any one of the vending release mechanisms is operated, all interlock slides to the left of that particular vending release mechanism will be moved to the left to cause the pivotal movement of the catch member 114 for the latch lever 110, while the remainder of the interlock slides to the right of the particular operated vending release mechanism will move in the direction to the right of the drawings as shown by FIG. 11. Thus, the right-hand end slide 104 will be moved to bring its upstanding end surface 104a into engagement with the bell crank 105 to pivot it in the counterclockwise direction to the position shown by FIG. 11 out of engagement with the switch 62 which has been previously mentioned in connection with FIG. 2 of the drawings. When the bell crank lever 105 is pivoted to the position shown by FIG. 11 of the drawings, to disengage it with the operating lever 63 for the switch 62, the switch 62 will be operative to control the coin control accept and/or return mechanism 120 in a manner to return any coins deposited at such time. Thus while the interlock slide 104 is moved to the position to the right of the drawing as shown by FIG. 1, at a time when one of the vending release mechanisms is being operated, the switch 62 will be operative to cause any coins sought to be deposited while the vending machine is being operated to be returned. Also, as previously described, when the all ampty bar 60, as shown by FIG. 2 of the drawings is in the lowest position, at a time when all of the storage columns of the vending machine magazine are empty, the lever 65 connected to the all empty bar 60 and to the switch lever 63 for the switch 62 will also move the bell crank 105 in the counterclockwise direction and operate the switch 62 to the position shown by FIG. 11 of the drawings to return any coins deposited in the coin control accept and/or return mechanism 120. Thus a single control switch such as the switch 62 and its operating bell crank 105 therefor is effective to control the coin accept and/or return mechanism 120 to return coins deposited either while the vending machine is being operated or when the vending machine is sold out.

Considering again the interlock levers such as the lever 91 and the associated interlock slides such as the slides 100–104, it should be pointed out that the arrangement is such that, should a customer attempt to deposit a coin while at the same time applying pressure to an operating handle, the coin will be returned. This is in view of the fact that any pressure by the wedge pointed end such as the end 93 of the operating lever 91 on the interlock slides will cause the slide 104 to move to the right at least far enough to operate the bell crank 105 and the switch 62 for returning coins notwithstanding the fact that no movement of the interlock slides to the left is permitted with the latch bar 110 in the latched position.

Various modifications will occur to those skilled in the art.

I claim as my invention:

1. A check controlled vending machine comprising, check receiving and returning control means, a magazine having a plurality of respective article storage column structures, a plurality of respective article vending release mechanisms for each of said column structures mounted on said magazine to be operated to release a stored article from respective ones of said column structures, a plurality of aligned interlock slides mounted on said magazine and having normal positions and slidably movable in either of two opposite directions from their normal positions along a path in bridging relation to all of said release mechanisms, a plurality of interlock slide operating levers each associated with a respective one of said release mechanisms and mounted on said magazine to be movable upon operation of each release mechanism to engage selected ones of said slides to move one or more of said slides in one of said opposite directions and simultaneously move the remainder of said slides in the other of said opposite directions, the arrangement of said levers and said slides together with said release mechanisms being such as to prevent movement of more than one lever and operation of more than one mechanism so long as the slides are moved from their normal positions upon operation of any one of said release mechanisms, means responsive to the movement of at least one of said slides from the normal position to a selected one of said opposite directions to operate said check control means to return checks deposited while any one of said release mechanisms are operated, latch means mounted on said magazine to have a normal position preventing movement of said slides in the other one of said opposite directions to thereby prevent operation of any of said release mechanisms, means controlled by said check control means to move said latch means to an operated position to permit movement of said slides to the other one of said opposite positions and thereby allow operation of one of said release mechanisms, and means responsive to movement of one of said slides to the other one of said opposite positions to return said latch means to its normal position.

2. The invention of claim 1 having a plurality of empty signals each comprised of a plunger extending through a wall of said cabinet structure to have a normal nonempty indicating position and an extended operated empty indicating position, a respective spring lever for each of said plungers and connected to normally maintain the respective plunger in the normal position, and means interconnecting respective ones of said empty sensing mechanism and a respective spring lever to yieldingly move a respective plunger to the operated position.

3. A check controlled vending machine comprising, a walled cabinet structure, check receiving and returning control means, a magazine having a plurality of respective article storage column structures, a plurality of respective article vending release mechanisms for each of said column structures mounted on said magazine to be operated to release a stored article from respective ones of said column structures, a plurality of aligned interlock slides mounted on said magazine and having normal positions and slidably movable in either of two opposite directions from their normal positions along a path in bridging relation to all of said release mechanisms, a plurality of interlock slide operating levers each associated with a respective one of said release mechanisms and mounted on said magazine to be movable upon operation of each release mechanism to engage selected ones of said slides to move one or more of said slides in one of said opposite directions and simultaneously move the remainder of said slides in the other of said opposite directions, the arrangement of said levers and said slides together with said release mechanisms being such as to prevent movement of more than one lever and operation of more than one mechanism so long as the slides are moved from their normal positions upon operation of any one of said release mechanisms, check return means responsive to the movement of at least one of said slides from the normal position to a selected one of said opposite directions to operate said check control means to return checks deposited while any one of said release mechanisms are operated, a plurality of respective empty sensing mechanisms associated with each of said column structures and connected to respective ones of said release mechanisms to be moved to an operated position to prevent operation of a respective release mechanism when the respective column structure is empty of articles to be vended, a plurality of individual column empty signals responsive to the movement of respective ones of said sensing mechanisms to their operated positions to thereby indicate an empty condition of the respective column structure, common control means having a normal position and connected to each of said empty sensing mechanisms to be moved to an operated position when all of said sensing mechanisms are operated, and means interconnecting said common control means and said check return means to operate said check control means to return checks while said common control means is in its operated position.

4. The invention of claim 3 in which each of said empty signals is comprised of a plunger extending through a wall of said cabinet structure to have a normal non-empty indicating position and an extended operated empty indicating position, a respective spring lever for each of said plungers and connected to normally maintain the respective plunger in the normal position, and means interconnecting respective ones of said empty sensing mechanism and a respective spring lever to yieldingly move a respective plunger to the operated position.

5. A check controlled vending machine comprising, a walled cabinet structure, check receiving and returning control means, a magazine having a plurality of respective article storage column structures, a plurality of respective article vending release mechanisms for each of said column structures mounted on said magazine to be operated to release a stored article from respective ones of said column structures, interlock means associated with said release mechanisms to be operated to prevent simultaneous operation of more than one of said release mechanisms upon operation of any one of said release mechanisms, means responsive to the operation of said interlock means to thereby operate said check control means to return checks deposited while any one of said release mechanisms are operated, a plurality of respective empty sensing mechanisms associated with each of said column structures and connected to respective ones of said release mechanisms to be moved to an operated position to prevent operation of a respective release mechanism when the respective column structure is empty of articles to be vended, a plurality of individual column empty signals responsive to the movement of respective ones of said sensing mechanisms to their operated positions to thereby indicate an empty condition of the respective column structure, each of said empty signals comprising a plunger extending through a wall of said cabinet structure to have a normal non-empty indicating position and an extended operated empty indicating position, a respective spring lever for each of said plungers and connected to normally maintain the respective plunger in the normal position, and means interconnecting respective ones of said empty sensing mechanisms and a respective spring lever to yieldingly move a respective plunger to the operated position.

6. A check controlled vending machine comprising, a walled cabinet structure, check receiving and returning control means, a magazine having a plurality of respective article storage column structures, a plurality of respective article vending release mechanisms for each of said column structures mounted on said magazine to be operated to release a stored article from respective ones of said column structures, interlock means associated with said release mechanisms to be operated to prevent simultaneous operation of more than one of said release mechanisms upon operation of any one of said release mechanisms, check return means responsive to the operation of said interlock means to thereby operate said check control means to return checks deposited while any one of said release mechanisms are operated, a plurality of respective empty sensing mechanisms associated with each of said column structures and connected to respective ones of said release mechanisms to be moved to an operated position to prevent operation of a respective release mechanism when the respective column structure is empty of articles to be vended, a plurality of individual column empty signals responsive to the movement of respective ones of said sensing mechanisms to their operated positions to thereby indicate an empty condition of the respective column structure, common control means having a normal position and connected to each of said empty sensing mechanisms to be moved to an operated position when all of said sensing mechanisms are operated, means interconnecting said common control means and said check return means to operate said check control means to return checks while said common control means is in its operated position each of said empty signals comprising a plunger extending through a wall of said cabinet structure to have a normal non-empty indicating position and an extended operated empty indicating position, a respective spring lever for each of said plungers and connected to normally maintain the respective plunger in the normal position, and means interconnecting respective ones of said empty sensing mechanisms and a respective spring lever to yieldingly move a respective plunger to the operated position.

References Cited by the Examiner
UNITED STATES PATENTS

| | | | |
|---|---|---|---|
| 2,384,089 | 9/1945 | Handley et al. | 221—125 X |
| 2,513,595 | 7/1950 | Stewart | 221—125 |
| 2,863,587 | 12/1958 | Schinzel | 221—125 X |

ROBERT B. REEVES, *Primary Examiner.*

STANLEY H. TOLLBERG, *Examiner.*